(12) United States Patent
Nakamura et al.

(10) Patent No.: US 6,367,437 B2
(45) Date of Patent: Apr. 9, 2002

(54) VALVE TIMING CONTROL SYSTEM FOR INTERNAL COMBUSTION ENGINE

(75) Inventors: Mitsuhiro Nakamura; Yoshiharu Sudani, both of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/796,550

(22) Filed: Mar. 2, 2001

(30) Foreign Application Priority Data

Mar. 10, 2000 (JP) ........................................ 2000-066429

(51) Int. Cl.$^7$ .................................................. F01L 1/34
(52) U.S. Cl. .................................. 123/90.17; 123/90.19
(58) Field of Search .......................... 123/90.11, 90.15, 123/90.16, 90.17, 90.18, 90.19

(56) References Cited

U.S. PATENT DOCUMENTS

| | | | | |
|---|---|---|---|---|
| 5,937,808 A | * | 8/1999 | Kako et al. | 123/90.15 |
| 5,957,095 A | * | 9/1999 | Kako | 123/90.15 |
| 6,024,062 A | * | 2/2000 | Kako et al. | 123/90.17 |
| 6,161,511 A | * | 12/2000 | Hashimoto | 123/90.15 |

\* cited by examiner

Primary Examiner—Weilun Lo
(74) Attorney, Agent, or Firm—Arent Fox Kintner Plotkin & Kahn, PLLC

(57) ABSTRACT

There is provided a valve timing control system for an internal combustion engine, which is capable of suitably controlling a hydraulic pressure control valve 10 for control of a cam phase irrespective of a temperature condition of a coil 100 of the control valve 10, thereby enhancing the accuracy of feedback control of the cam phase. The control valve 10 drives a cam phase change mechanism 8 according to an amount of current flowing through the coil 100. An ECU 2 feedback-controls a provisional duty factor DOUTVT for controlling the amount of current such that an actual cam phase CAIN becomes equal to a desired cam phase CAINCMD. The ECU 2 sets a desired current amount VTCIOBJ based on the provisional duty factor obtained by the feedback control. The ECU 2 feedback-controls an output duty factor DDOUT for control of the amount of current supplied to the control valve 10 such that an actual current amount VTCIACT becomes equal to a desired current amount VTCIOBJ.

5 Claims, 11 Drawing Sheets

VALVE TIMING CONTROL SYSTEM FOR INTERNAL COMBUSTION ENGINE

BACKGROUND OF THE INVENTION

1. Field of the Invention

This invention relates to a valve timing control system for an internal combustion engine, which varies the cam phase of at least one of an intake cam and an exhaust cam, relative to a crankshaft of the engine, to thereby control valve timing.

2. Description of the Prior Art

Conventionally, a valve timing control system of the above-mentioned kind was proposed e.g. in Japanese Laid-Open Patent Publication (Kokai) No. 9-217609. In this control system, a cam phase change mechanism supplied with hydraulic pressure controlled by an hydraulic pressure control valve changes the cam phase by changing the angle of a camshaft relative to a cam pulley. The hydraulic pressure control valve formed by a linear solenoid valve includes a coil and a spool driven by a force generated by the coil. The output duty factor of current supplied to the coil is controlled to drive the spool to a position corresponding to the output duty factor, i.e. the amount of current supplied to the coil, whereby hydraulic pressure is selectively supplied to an advance chamber or a retard chamber of the cam phase change mechanism, to drive the cam phase in an advancing or retarding direction. Further, when the output duty factor is controlled to a hold duty factor value approximately in the center of a control range thereof, the spool is controlled to a neutral position for simultaneously closing the advance chamber and the retard chamber, thereby cutting off supply of the hydraulic pressure to both of the chambers. This holds the cam phase. Further, in this control system, the output duty factor is feedback-controlled such that an actual cam phase detected becomes equal to a desired cam phase set in dependence on operating conditions of the engine.

The control system, however, suffers from a problem that the cam phase cannot be controlled with accuracy when the temperature condition of the hydraulic pressure control valve is changed. More specifically, in the linear solenoid valve which is used in the control system as a hydraulic pressure control valve, the resistance of the coil varies with its temperature, so that the amount of current actually flowing through the coil varies even if the output duty factor remains the same. For instance, under a low temperature condition of the coil, the resistance of the coil is small, so that even if the output duty factor remains the same, the amount of current actually flowing through the coil increases. This increase in the current amount reduces the hold duty factor value, thereby causing the whole control range of the output duty factor to shift in the direction of a lower output duty factor, and at the same time increases a change in hydraulic pressure per unit change in the output duty factor (i.e. increases sensitivity of the hydraulic pressure control valve), resulting in an inevitable decrease in the controllable range of the output duty factor. On the other hand, under a high temperature condition of the coil, the resistance of the coil increases, so that the amount of current flowing through the coil increases even if the output duty factor remains the same. This increases the hold duty factor value, thereby causing the whole control range of the output duty factor to shift in the direction of a higher output duty factor, and at the same time reduces a change in hydraulic pressure per unit change in the output duty factor (i.e. decreases sensitivity of the hydraulic pressure control valve), resulting in an increased controllable range of the output duty factor and enhanced control accuracy.

In spite of this problem, the above conventional control system simply controls the amount of current supplied to the coil of the hydraulic pressure control valve by the output duty factor calculated based on the desired cam phase and the actual cam phase by feedback control without further processing. Therefore, even if the output duty factor is calculated such that the optimum cam phase corresponding to the present operating condition of the engine can be obtained, the behavior of the hydraulic pressure control valve and that of the cam phase change mechanism controlled thereby are varied depending on the actual coil temperature due to the above temperature characteristics of the control valve, which prevents control of the cam shaft to an intended cam phase, thereby making it impossible to perform accurate cam phase control.

To solve such a problem, it is contemplated, for instance, that the actual temperature of the coil is detected to correct the output duty factor based on a result of the detection. In this case, however, a temperature sensor for detecting the coil temperature is additionally required. Further, in general, temperatures are slow in change, and the temperature of the coil largely depends on environments surrounding the coil, such as the temperature within an engine room of an automotive vehicle on which the control system is installed, wind generated by running of the vehicle, and heat generated in the coil by current flowing therethrough. This makes it difficult to accurately estimate the amount of current which is actually flowing through the coil at the time of detection of the coil temperature, based on the detected coil temperature or compensate for variation therein. As a result, the cam phase cannot be controlled with accuracy.

SUMMARY OF THE INVENTION

It is an object of the invention to provide a valve timing control system for an internal combustion engine, which is capable of properly controlling a control valve for control of a cam phase irrespective of temperature conditions of a coil of the control valve, thereby enhancing the accuracy of feedback control of the cam phase.

To attain the above object, the present invention provides a valve timing control system for an internal combustion engine, which includes a crankshaft, an intake valve, an exhaust valve, an intake cam, and an exhaust cam, and controls valve timing of at least one of the intake valve and the exhaust valve, by changing a cam phase which is a phase of at least one of the intake cam and the exhaust cam, relative to the crankshaft.

The valve timing control system according to the invention is characterized by comprising:

a cam phase change mechanism for changing the cam phase;

a control valve having a coil, for driving the cam phase change mechanism according to an amount of current flowing through the coil;

actual cam phase-detecting means for detecting an actual cam phase;

desired cam phase-setting means for setting a desired cam phase depending on operating conditions of the engine;

cam phase feedback control means for feedback-controlling a control value for control of the amount of current such that the actual cam phase becomes equal to the desired cam phase;

desired current amount-setting means for setting a desired amount of current based on the control value controlled by the cam phase feedback control means;

actual current amount-detecting means for detecting an actual amount of current actually flowing through the coil of the control valve; and current feedback control means for feedback-controlling an output control value for control of the amount of current supplied to the control valve such that the actual amount of current becomes equal to the desired amount of current.

According to this valve timing control system, a control value used for controlling the amount of current flowing through the coil is feedback-controlled such that the actual cam phase becomes equal to the desired cam phase. Further, a desired amount of current is set based on the control value controlled by the feedback control, while an actual amount of current flowing through the coil of the control valve is detected. An output control value for control of the amount of current supplied to the control valve is feedback-controlled such that the actual amount of current becomes equal to the desired amount of current. This causes current to be supplied to the control value in an amount corresponding to the calculated output control value, whereby the amount of current flowing through the coil is properly controlled.

As described above, according to the invention, the valve timing control system carries out not only cam phase feedback control in which the control value for control of the amount of current supplied to the control valve is feedback-controlled such that the actual cam phase becomes equal to the desired cam phase, but also current feedback control in which the output control value for finally controlling the amount of current supplied to the control valve is feedback-controlled such that the actual amount of current flowing through the coil of the control valve becomes equal to an optimum desired amount of current set based on the control value calculated by the cam phase feedback control. Thus, the actual amount of current flowing through the coil is directly detected, and the output control value is feedback-controlled such that the actual amount of current becomes equal to the optimum desired amount of current. This makes it possible to cope with all the temperature conditions of the coil, so as to suitably compensate for variations in the behavior of the control valve, caused by changes in temperature of the coil. Therefore, it is possible to carry out optimum control of the operation of the control valve and that of the cam phase change mechanism irrespective of the temperature conditions of the coil, thereby enhancing accuracy of the cam phase feedback control.

Preferably, the control value and the output control value are values of an identical kind of control amount, and a range of values of the identical kind of control amount within which the output control value can be set is wider than a range of values of the identical kind of control amount within which the control value can be set.

More preferably, the identical kind of control amount is a duty factor of output of the current supplied to the coil.

Preferably, the desired current amount-setting means includes a conversion table for converting the control amount to the desired amount of current.

More preferably, the conversion table represents an optimum relationship between the control value and the desired amount of current obtained by the control value, under a normal temperature condition of the coil.

The above and other objects, features, and advantages of the invention will become more apparent from the following detailed description taken in conjunction with the accompanying drawings.

DETAILED DESCRIPTION OF PREFERRED EMBODIMENTS

Figure 1:
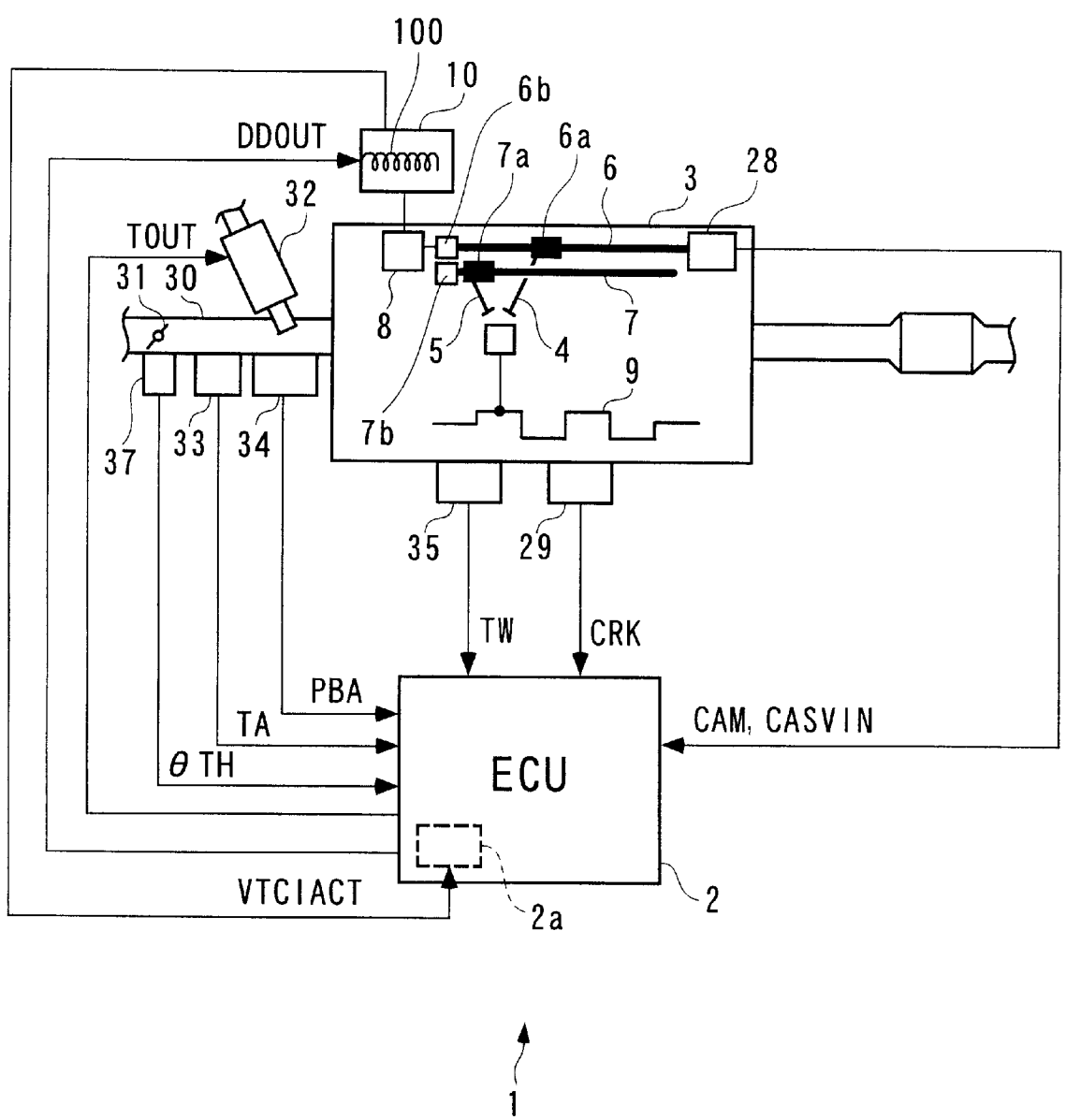
FIG. 1 is a block diagram schematically showing the arrangement of an internal combustion engine incorporating a valve timing control system according to an embodiment of the invention.

The invention will now be described in detail with reference to the drawings showing an embodiment thereof. Referring first to FIG. 1, there is schematically shown the arrangement of an internal combustion engine incorporating a valve timing control system (hereinafter simply referred to as "the control system") according to an embodiment of the invention. As shown in the figure, the control system 1 includes an ECU 2. In the present embodiment, the ECU 2 forms or implements actual cam phase-detecting means, desired cam phase-setting means, cam phase feedback control means, desired current amount-setting means, and current feedback control means, and carries out control processes, described hereinbelow, in dependence on operating conditions of the internal combustion engine (hereinafter simply referred to as "the engine") 3.

The engine 3 is a four-stroke cycle DOHC (double overhead camshaft) gasoline engine, for instance, which includes an intake camshaft 6 and an exhaust camshaft 7. The intake and exhaust camshafts 6, 7 are connected to a crankshaft 9 by their respective driven sprockets 6b, 7b, and a timing chain, not shown, for rotating through 360 degrees as the crankshaft 9 rotates through 720 degrees. The intake camshaft 6 is integrally formed with a plurality of intake cams 6a (only one of them is shown) for opening and closing respective intake valves 4 (only one of them is shown), and the exhaust camshaft 7 is integrally formed with a plurality of exhaust cams 7a (only one of them is shown) for opening and closing respective exhaust valves 5 (only one of them is shown).

Further, the intake camshaft 6 is rotatably connected to the driven sprocket 6b thereof such that the intake camshaft 6 can be rotated or turned within a range of a predetermined angle. By changing a relative angle of the intake camshaft 6 with respect to the driven sprocket 6b, the phase angle (hereinafter simply referred to as "the cam phase") CAIN of each intake cam 6a relative to the crankshaft 9 is changed to advance or retard the opening/closing timing (valve timing) of the intake valve 4. Arranged at one end of the intake camshaft 6 are a cam phase change mechanism (hereinafter referred to as "the VTC") 8 for controlling the cam phase CAIN, and an hydraulic pressure control valve 10 (control valve).

The VTC 8 includes an advance chamber, not shown, and a retard chamber, not shown, which are defined on opposite sides of a vane, not shown, integrally formed with the intake camshaft 6, and is configured such that hydraulic pressure from an oil pump driven by the engine 3 is selectively supplied to the advance chamber or the retard chamber under control of a hydraulic pressure control valve 10 to thereby turn the intake camshaft 6 in an advancing direction or a retarding direction relative to the driven sprocket 6b.

The hydraulic pressure control valve 10 is formed by a linear solenoid valve which includes a coil 100, and a spool, not shown, driven by a force generated by the coil 100. The hydraulic pressure control valve 10 is constructed such that the position of the spool thereof is continuously changed according to an output duty factor DDOUT (control value), controlled by the ECU 2, of current (pulse current) supplied to the coil 100. The advance chamber or retard chamber of the VTC 8 is opened and closed depending on the position of the spool. More specifically, when the output duty factor DDOUT (output control value) (hereinafter simply referred to as "the output duty factor DDOUT") of current to be supplied to the hydraulic pressure control valve 10 is larger than a hold duty factor value (e.g. 50%) for holding the cam phase, the spool of the hydraulic pressure control valve 10 is moved from its neutral position toward one side for opening the advance chamber, whereby the hydraulic pressure is supplied to the advance chamber to place the VTC 8 in a state advancing the cam phase CAIN. On the other hand, when the output duty factor DDOUT is smaller than the hold duty factor value, the spool is moved from its neutral position toward the other side for opening the retard chamber, whereby the hydraulic pressure is supplied to the retard chamber to place the VTC 8 in a state retarding the cam phase CAIN. It should be noted that the intake cam 6a can be moved through 60 degrees crank angle with its full retard position being 25 degrees crank angle BTDC and its full advance position being 85 degrees crank angle BTDC. The cam phase CAIN is 0 degrees crank angle when it is in the full retard position, whereas when the cam phase CAIN is in the full advance position, it is 60 degrees crank angle.

Further, when the output duty factor DDOUT is equal to the hold duty factor value, the hydraulic pressure control valve 10 is placed in a cam phase-holding state in which the spool thereof is located in the neutral position for simultaneously closing the advance chamber and the retard chamber. In this state, supply of the hydraulic pressure to the advance chamber and the retard chamber is cut off, and the intake camshaft 6 and the driven sprocket 6b are fixedly connected to each other, whereby the cam phase CAIN is held at a value to which it has been controlled by the VTC 8.

A cam angle sensor 28 (actual cam phase-detecting means) is arranged at the other end of the intake camshaft 6, opposite to the one end at which the VTC 8 is arranged. The cam angle sensor 28 is comprised e.g. of a magnet rotor and an MRE (magnetic resistance element) pickup, and delivers a cam pulse CAM to the ECU 2 whenever the camshaft 6 rotates through a predetermined angle (e.g. 180 degrees). The sensor 28 detects a cam angle CASVIN of the intake cam 6a measured with respect to a TDC (top dead center) position, and delivers a signal indicative of the sensed cam angle CASVIN to the ECU 2.

The crankshaft 9 has a crank angle position sensor 29 (actual cam phase-detecting means) arranged therefor. The crank angle position sensor 29 is constructed similarly to the above cam angle sensor 28, and delivers a crank pulse CRK to the ECU 2 whenever the crankshaft 9 rotates through a predetermined angle (e.g. 30 degrees). Further, the crank angle position sensor 29 is formed with a tooth, not shown, indicating a reference position of the crankshaft 9. The tooth causes a reference pulse to be output whenever the crankshaft 9 rotates through 360 degrees. The ECU 2 calculates (detects) an actual cam phase CAIN based on the crank pulse CRK and the signal indicative of the cam angle CASVIN output from the cam angle sensor 28. Further, the ECU 2 determines an engine rotational speed NE based on the crank pulse CRK.

The engine 3 has an intake pipe 30 in which is arranged a throttle valve 31 having a throttle valve opening sensor 37 attached thereto. Further, injectors 32 (only one of them is shown), an intake air temperature sensor 33, and an intake air pressure sensor 34 are inserted into the intake pipe 30 at respective locations downstream of the throttle valve 31. Each injector 32 has its fuel injection time period (fuel injection amount) TOUT controlled by a drive signal delivered from the ECU 2.

The intake air temperature sensor 33 senses a temperature (intake air temperature TA) of intake air within the intake pipe 30 and supplies a signal indicative of the sensed intake air temperature TA to the ECU 2. The intake air pressure sensor 34 senses an absolute pressure PBA within the intake pipe 30 and supplies a signal indicative of the sensed absolute pressure PBA to the ECU 2. The throttle valve opening sensor 37 senses an opening degree $\theta$TH of the throttle valve 31 (hereinafter referred to as "the throttle valve opening $\theta$TH") and supplies a signal indicative of the sensed throttle valve opening $\theta$TH to the ECU 2. Further, an engine coolant temperature sensor 35 is mounted in the cylinder block of the engine 3. The engine coolant temperature sensor 35 senses a temperature (engine coolant temperature TW) of an engine coolant circulating within the cylinder block of the engine 3 and supplies a signal indicative of the sensed engine coolant temperature TW to the ECU 2.

The ECU 2 is formed by a microcomputer including an I/O interface, a CPU, a RAM, and a ROM, none of which are shown. The signals from the above sensors are each input to the CPU after A/D conversion and waveform shaping by the I/O interface. Further, the ECU 2 includes a current-detecting circuit 2a (actual current amount-detecting means) which detects an actual amount VTCIACT of current actually flowing through the coil 100 of the hydraulic pressure control valve 10.

The CPU 2 determines an operating condition of the engine 3 based on these signals, and in dependence on the determined operating condition, carries out control of the VTC 8 (hereinafter referred to as "the VTC control") in the manner described hereinafter, according to a control program and data read from the ROM, and data read from the RAM.

Figure 2:
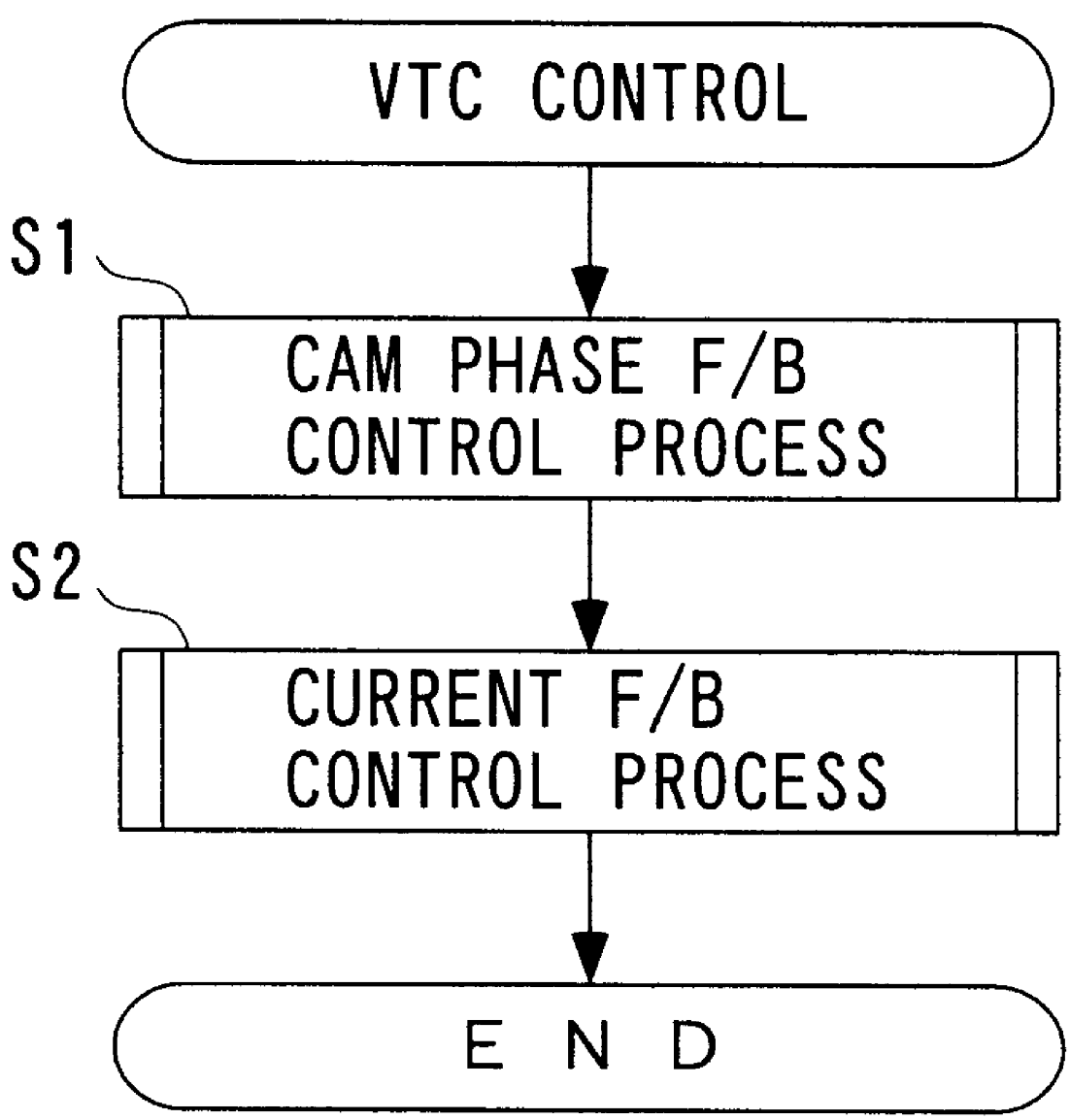
FIG. 2 is a flowchart showing a main routine of a VTC control process carried out by the FIG. 1 valve timing control system.

FIG. 2 is a flowchart showing a main routine of an overall control process for the above VTC control. This control process is executed at predetermined time intervals (e.g. every 10 ms). At a step S1 in the figure, a cam phase feedback (F/B) control process is carried out in which a provisional duty factor DOUTVT is calculated by feedback control based on a desired cam phase CAINCMD set in dependence on operating conditions of the engine 3, and the actual cam phase CAIN detected by the cam angle sensor 28. Further, at a step S2, a current feedback (F/B) control process is carried out in which the output duty factor DDOUT for finally controlling the amount of current supplied to the hydraulic pressure control valve 10 is calculated by feedback control based on a desired current amount VTCIOBJ set based on the provisional duty factor DOUTVT calculated at the step S1, and the actual current amount VTCIACT detected by the current-detecting circuit 2a.

Figure 3:
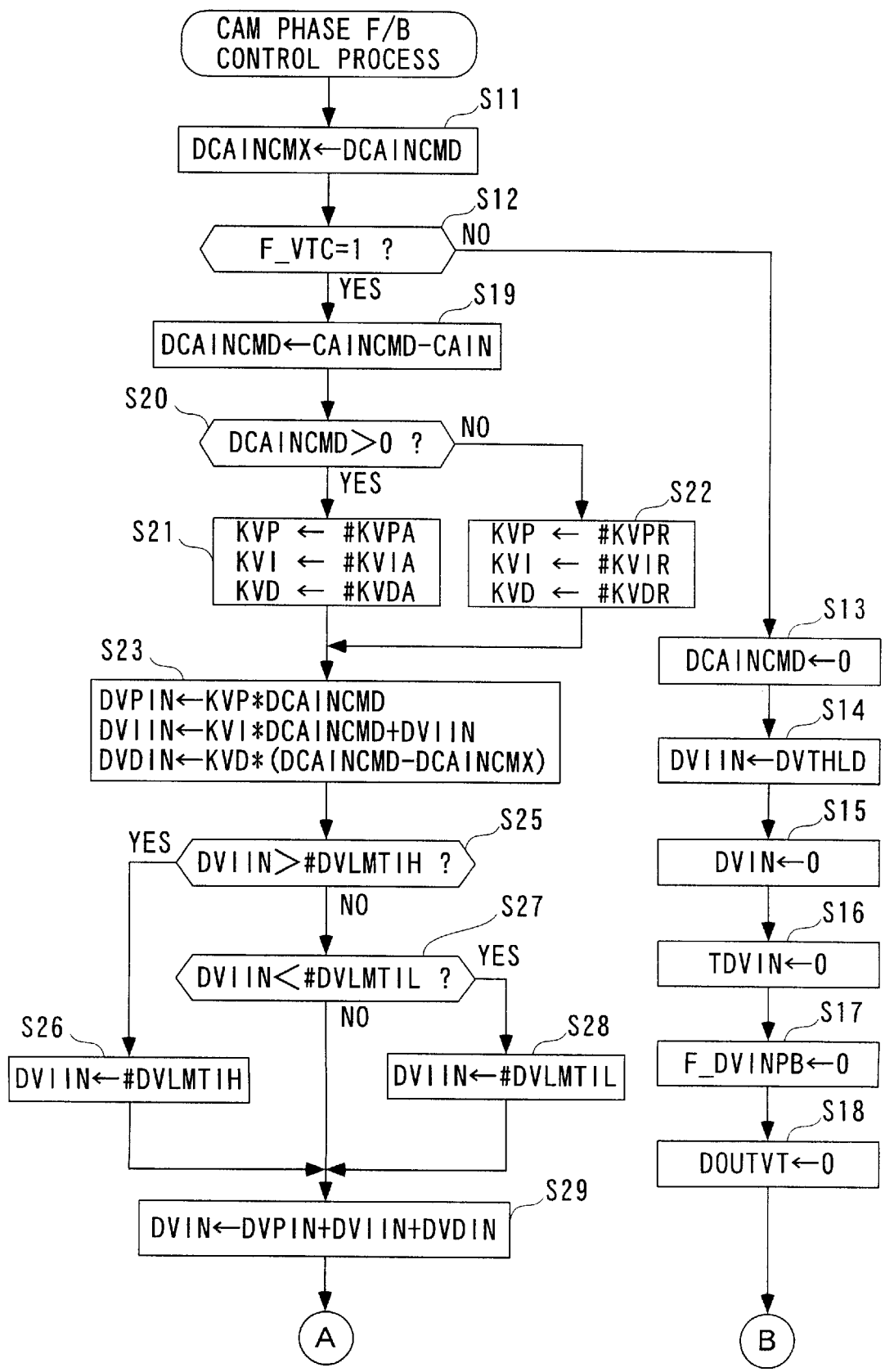
FIG. 3 is a flowchart showing a subroutine for carrying out a cam phase feedback control process in FIG. 2.
Figure 4:
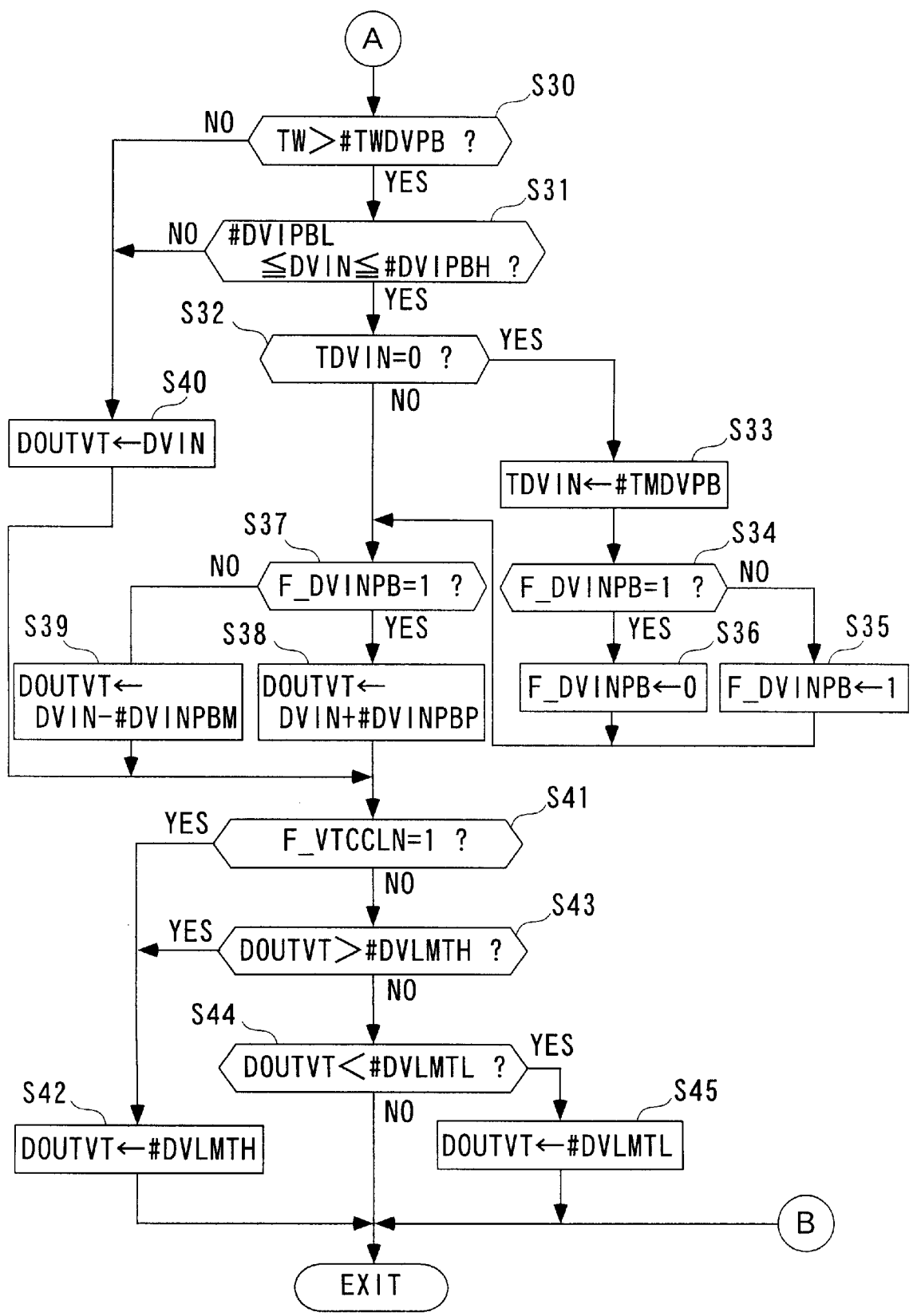
FIG. 4 is a continuation of the FIG. 3 flowchart.

FIGS. 3 and 4 are diagrams showing a subroutine for carrying out a cam phase F/B control process. It should be noted that in the following description, a symbol # is added to each of heads of fixed values stored as data and table values beforehand in the ROM to thereby distinguish the fixed values from other variables which are updated.

In the cam phase F/B control process, first, at a step S11, a cam phase difference DCAINCMD (desired cam phase CAINCMD—actual cam phase CAIN) calculated on the immediately preceding occasion is stored as an immediately preceding value DCAINCMDX of the cam phase difference. Next, it is determined at a step S12 whether or not a VTC operation enable flag F_VTC assumes "1". The VTC operation enable flag F_VTC is set to "1" by a subroutine, not shown, when conditions for execution of the VTC control are satisfied. If the answer to the question of the step S12 is negative (No), i.e. if F_VTC=0 holds, which means that the conditions for execution of the VTC control are not satisfied, the program proceeds to steps S13 to S18. At the step S13, the cam phase difference DCAINCMD is set to a value "0", and at the step S14, an I term (integral term) DVIIN of a PID feedback control, referred to hereinafter, is set to a learned hold duty factor value DVTHLD. The learned hold duty factor value DVTHLD is obtained by learning the provisional duty factor DOUTVT determined when the hydraulic pressure control valve 10 is in the cam phase-holding state, through carrying out a subroutine, not shown, for correcting an error in the hold duty factor, caused by variations in hardware of the VTC 8 and the hydraulic pressure control valve 10. By executing the step S14, the learned hold duty factor value DVTHLD is set to be used as an initial value of the I term DVIIN at the start of the cam phase F/B control.

Then, at a step S15, a calculation duty value DVIN, referred to hereinafter, is set to "0". Further, at a step S16, a perturbation timer TDVIN, referred to hereinafter, is reset to "0", and at a step S17, a perturbation flag F_DVINPB is set to "0". Next, at a step S18, the provisional duty factor DOUTVT is set to "0", followed by terminating the program. By execution of these steps, if the conditions for carrying out the VTC control are not satisfied, the provisional duty factor DOUTVT is set to "0", whereby the hydraulic pressure control valve 10 is inhibited from operating, and the cam phase CAIN is held in the full retard position.

On the other hand, if the answer to the question of the step S12 is affirmative (Yes), i.e. if F_VTC=1 holds, which means that the conditions for carrying out the VTC control are satisfied, at a step S19, a difference (CAINCMD-CAIN) between the desired cam phase CAINCMD and the actual cam phase CAIN is calculated as the present cam phase difference DCAINCMD so as to execute the cam phase F/B control. Next, it is determined at a step S20 whether or not the calculated cam phase difference DCAINCMD is larger than "0". If the answer to the question of the step S20 is affirmative (Yes), i.e. if DCAINCMD>0 holds, which means that the desired cam phase CAINCMD is larger than the actual cam phase CAIN, in order to shift the cam phase CAIN in the advancing direction, at a step S21, the P-term gain KVP, I-term gain KVI, and D-term gain KVD of the control are set to advancing gains #KVPA, #KVIA, and #KVDA, respectively, which are fixed values identical to each other.

On the other hand, if the answer to the question of the step S20 is negative (No), i.e. if DCAINCMD≦0, which means that the desired cam phase CAINCMD is equal to or smaller than the actual cam phase CAIN, in order to shift the cam phase CAIN in the retarding direction, at a step S22, the P-term gain KVP, the I-term gain KVI, and the D-term gain KVD are set to retarding gains #KVPR, #KVIR, and #KVDR, respectively, which are fixed values identical to each other, and at the same time identical to the above advancing gains. Although in the above example, the six gains are all set to the same value, it is also possible to set the retarding gains to values larger or smaller than the advancing gains.

Next, at a step S23, the P-term gain KVP, the I-term gain KVI, and the D-term gain KVD calculated at the step S21 or S22 are used to calculate a P term DVPIN, the I term DVIIN, and a D term DVDIN, respectively, by the following equations:

$$DVPIN = KVP * DCAINCMD$$

$$DVIIN = KVI * DCAINCMD + DVIIN$$

$$DVDIN = KVD * (DCAINCMD - DCAINCMX)$$

Next at steps S25 to S28, limit checking of the I term DVIIN calculated at the step S23 is carried out. More specifically, it is determined at the step S25 whether or not the I term DVIIN is larger than an upper limit value #DVLMTIH (e.g. 65%). If DVIIN>#DVLMTIH holds, at a step S26, the I term DVIIN is set to the upper limit value #DVLMTIH. If the answer to the question of the step S25 is negative (No), it is determined at a step S27 whether or not the I term DVIIN is smaller than a lower limit value #DVLMTIL (e.g. 45%). If DVIIN<#DVLMTIL holds, at the step S28, the I term DVIIN is set to the lower limit value #DVLMTIL. If the answer to the question of the step S27 is negative (No), i.e. if #DVLMTIL≦DVIIN≦#DVLMTIH holds, the I term DVIIN is maintained. After the above limit checking of the I term DVIIN, at a step S29, the P term DVPIN, the I term DVIIN, and the D term DVDIN are added to calculate the calculation duty value DVIN.

Next, a perturbation process is carried out at steps S30 to S39. The perturbation process is executed in order to prevent decrease of a cam phase-holding force which is caused by reduction of hydraulic pressure in the advance chamber and retard chamber of the VTC 8 due to leakage of hydraulic fluid in the cam phase-holding state of the hydraulic pressure control valve 10. To this end, in the perturbation process, hydraulic pressure is supplied to the advance chamber and retard chamber of the VTC 8 by reciprocating (forcibly vibrating) the hydraulic pressure control valve 10 alternately in the advancing and retarding directions with respect to the neutral position.

First, it is determined at the step S30 whether or not the engine coolant temperature TW is higher than an upper limit value #TWDVPB (e.g. 100° C.). If TW≦#TWDVPB holds, the perturbation process is not carried out since it is determined that the temperature of the hydraulic fluid is not so high, which means that there is no fear of reduction of hydraulic pressure due to an increased oil temperature. Therefore, the program proceeds to a step S40, wherein the provisional duty factor DOUTVT is set to the calculation duty value DVIN calculated at the step S29. If the answer to the question of the step S30 is affirmative (Yes), i.e. if TW>#TWDVPB holds, it is determined at a step S31 whether or not the calculation duty value DVIN is equal to or larger than a lower limit value #DVIPBL (e.g. 45%), and at the same time equal to or lower than an upper limit value #DVIPBH (e.g. 60%) thereof. This determination is carried out to determine whether or not the calculation duty value DVIN is a value for placing the hydraulic pressure control valve 10 in the cam phase-holding state. Therefore, if the answer to the question of the step S31 is negative (No), it is determined that conditions for carrying out the perturbation process are not satisfied, and the program proceeds to the step S40.

On the other hand, if the answer to the question of the step S31 is affirmative (Yes), that is, if #DVIPBL≦DVIN≦#DVIPBH holds, it is determined that the conditions for carry out the perturbation process are fulfilled, so that the perturbation process is carried out at a step S32 et seq. First, it is determined at the step S32 whether or not the count of the perturbation timer TDVIN is equal to "0". The perturbation timer TDVIN is reset to "0" at the step S16 when the conditions for carrying out the VTC control are not satisfied, and hence the first answer to the question of the step S32 is affirmative (Yes), so that the program proceeds to a step S33, wherein the perturbation timer TDVIN is set to a predetermined time period #TMDVPB (0.1 second, for instance). Next, it is determined at a step S34 whether or not the perturbation flag F_DVINPB assumes "1". The perturbation flag F_DVINPB is also set to "0" at the step S17, and the first answer to the question of the step S34 is negative (No), so that the program proceeds to a step S35, wherein the perturbation flag F_DVINPB is set to "1". If the answer to the question of the step S34 is affirmative (Yes), the perturbation flag F_DVINPB is set to "0" at a step S36. In short, the perturbation flag F_DVINPB is inverted between "1" and "0" every predetermined time period #TMDVPB.

At a step S37 following the above step S35 or S36, it is determined whether or not the perturbation flag F_DVINPB assumes "1". If F_DVINPB=1 holds, at a step S38, an additional amount #DVINPBP (e.g. 5%) is added to the calculation duty value DVIN, and the resulting value is set to the provisional duty factor DOUTVT. On the other hand, if F_DVINPB=1 holds at the step S37, at the step S39, a subtractive amount #DVINPBM (e.g. 5%) which is identical to the additional amount #DVINPBP is subtracted from the calculation duty value DVIN, and the resulting value is set to the provisional duty factor DOUTVT.

By carrying out the above perturbation process, so long as the conditions for carrying out the perturbation process are satisfied, the addition of the additional amount #DVINPBP to the calculation duty value DVIN, and subtraction of the subtractive amount #DVINPBM from the calculation duty value DVIN are alternately performed every predetermined time period #TMDVPB. As a result, the pressure of the hydraulic fluid is forcibly replenished when the hydraulic pressure control valve 10 is in the cam phase-holding state, whereby it is possible to prevent decrease of the cam phase-holding force due to reduced hydraulic pressure in the VTC 8, and reliably hold (the spool of) the hydraulic pressure control valve 10 in the neutral position. Although in the above example, the additional amount #DVINPBP and the subtractive amount #DVINPBM are set to the same value, this is not limitative, but it is also possible to set the additional amount #DVINPBP to a larger value than the subtractive amount #DVINPBM so as to compensate for tendency of the intake cam 6a to return in the retarding direction due to the reaction force thereof.

Then, at a step S41 following the step S38, S39, or S40, it is determined whether or not a cleaning enable flag F_VTCCLN assumes "1". The cleaning enable flag F_VTCCLN is set to "1" by a subroutine, not shown, in order to prevent the VTC 8 and the hydraulic pressure control valve 10 from being undesirably fixed, when conditions for carrying out "cleaning" in which the VTC 8 is forcibly moved from the full retard position to the full advance position are satisfied. If the answer to the question of the step S41 is affirmative (Yes), i.e. if the conditions for carrying out the cleaning are satisfied, at a step S42, the provisional duty factor DOUTVT is set to an upper limit value #DVLMTH (90%, for instance) for carrying out the cleaning, followed by terminating the program.

On the other hand, if F_VTCCLN=0 holds at the step S41, limit checking of the provisional duty factor DOUTVT is carried out. More specifically, it is determined at a step S43 whether or not the provisional duty factor DOUTVT is larger than the upper limit value #DVLMTH. If DOUTVT>#DVLMTH holds, the program proceeds to the above step S42, wherein the provisional duty factor DOUTVT is set to the upper limit value #DVLMTH. If the answer to the question of the step S43 is negative (No), it is determined at a step S44 whether or not the provisional duty factor DOUTVT is smaller than a lower limit value #DVLMTL (e.g. 10%). If DOUTVT<#DVLMTL holds, the provisional duty factor DOUTVT is set to the lower limit value #DVLMTL at a step S45. If the answer to the question of the step S44 is negative (No), i.e. if #DVLMTL≦DOUTVT≦#DVLMTH holds, the provisional duty factor DOUTVT is maintained, followed by terminating the program. As described above, the cam phase F/B control is executed based on the desired cam phase CAINCMD and the actual cam phase CAIN, whereby the provisional duty factor DOUTVT is calculated.

Figure 5:
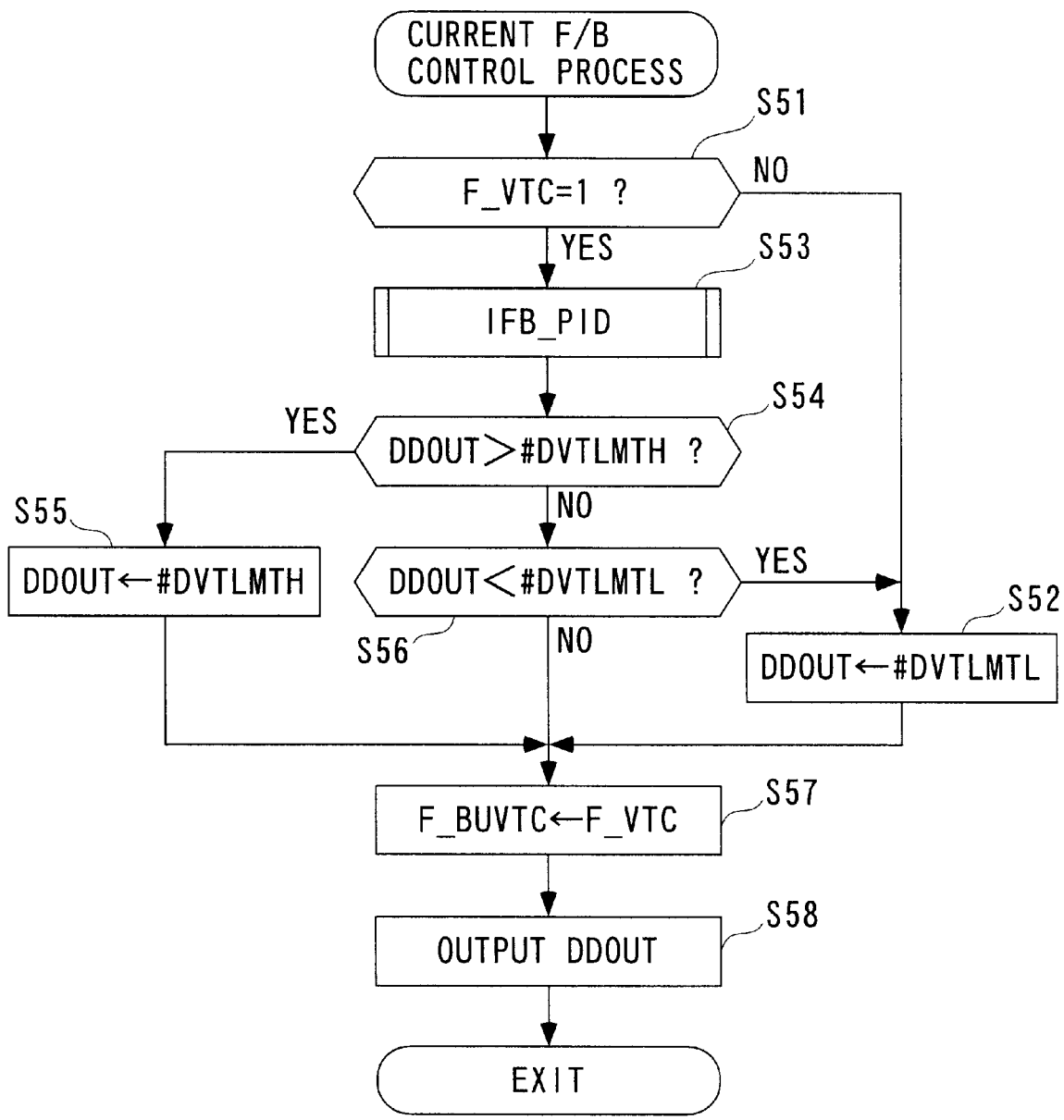
FIG. 5 is a flowchart showing a subroutine for carrying out a current F/B control process in FIG. 2.

FIG. 5 shows a subroutine for carrying out the current F/B control process executed at the step S2 in FIG. 2. As described hereinabove, the current F/B control process is carried out to set the desired current amount VTCIOBJ based on the provisional duty factor DOUTVT calculated as above, and calculate the output duty factor DDOUT for finally controlling the amount of current supplied to the hydraulic pressure control valve 10, by the feedback control, based on the desired current amount VTCIOBJ and the actual current amount VTCIACT detected by the current-detecting circuit 2a.

In the current F/B control process, first, it is determined at a step S51 whether or not the VTC operation enable flag F_VTC assumes "1". If the answer to the question of the step S51 is negative (No), i.e. if the conditions for carrying out the VTC control are not satisfied, the output duty factor DDOUT is set to a lower limit value #DVTLMTL (5%, for instance) which is smaller than the above-mentioned lower limit value #DVLMTL of the provisional duty factor DOUTVT, at a step S52. On the other hand, if the answer to the question of the step S51 is affirmative (Yes), i.e. if the conditions for carrying out the VTC control are satisfied, the output duty factor DDOUT is calculated by the current F/B control at a step S53. This calculation is performed by a subroutine, shown in FIG. 6, for calculating the output duty factor DDOUT. This subroutine will be described in detail hereinafter.

Next, limit checking of the calculated output duty factor DDOUT is carried out at steps S54 to S56. First, it is determined at the step S54 whether or not the output duty factor DDOUT is larger than an upper limit value #DVTLMTH (95%, for instance) which is larger than the upper limit value #DVLMTH of the provisional duty factor DOUTVT, described above. If DDOUT>#DVTLMTH holds, the output duty factor DDOUT is set to the upper limit value #DVTLMTH at the step S55. If the answer to the question of the step S54 is negative (No), it is determined at a step S56 whether or not the output duty factor DDOUT is smaller than the above lower limit value #DVTLMTL. If DDOUT<#DVTLMTL holds, the program proceeds to the step S52, wherein the output duty factor DDOUT is set to the lower limit value #DVTLMTL. If the answer to the question of the step S56 is negative (No), i.e. if #DVTLMTL≦DDOUT≦#DVTLMTH holds, the output duty factor DDOUT is maintained.

Next, after the present value of the VTC operation enable flag F_VTC is set to an immediately preceding value flag F_BUVTC associated with the flag F_VTC, i.e. stored as the flag F_BUVTC at a step S57, the amount of current corresponding to the output duty factor DDOUT is supplied to the hydraulic pressure control valve 10 at a step S58, followed by terminating the program.

Figure 6:
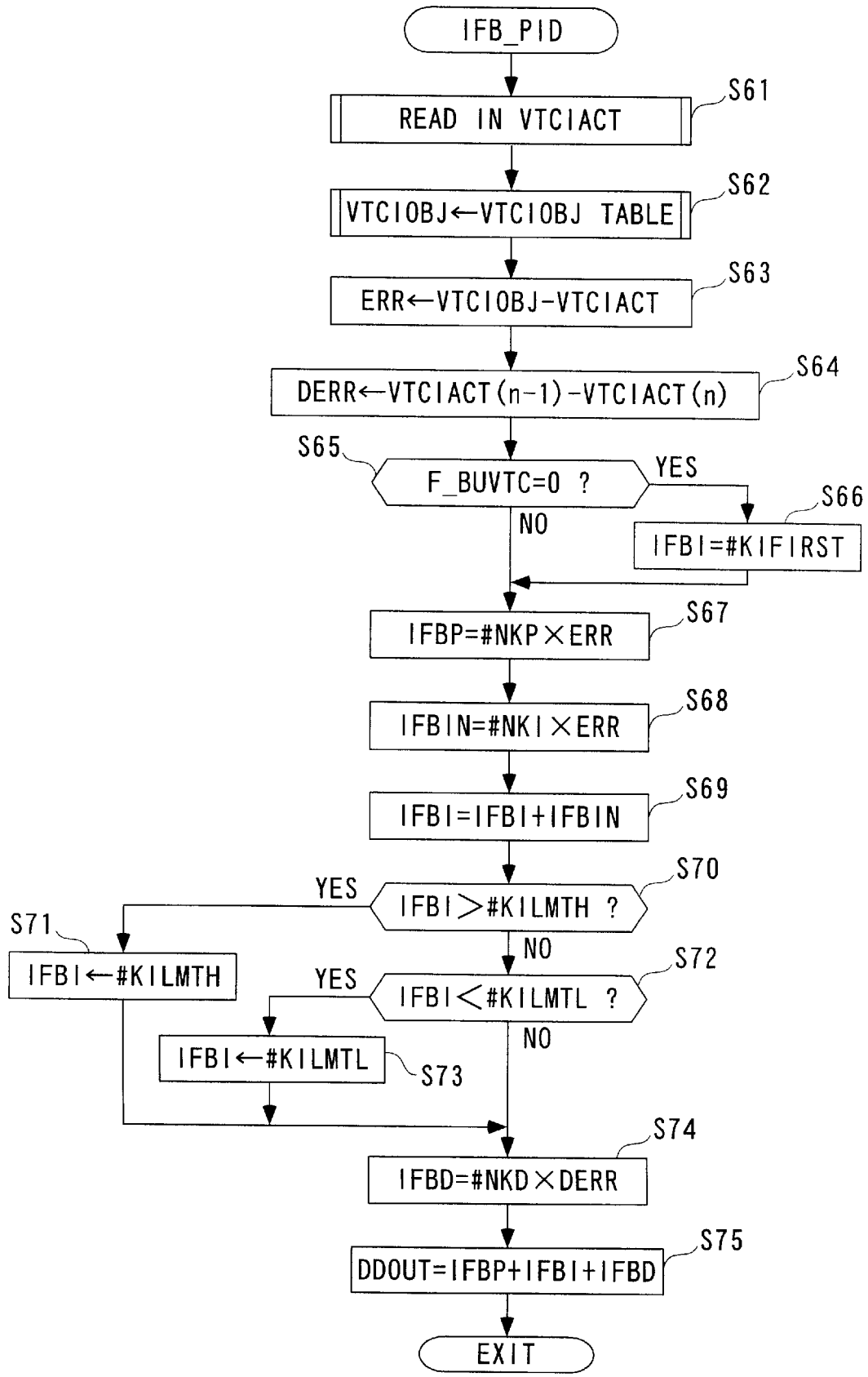
FIG. 6 is a flowchart showing a subroutine for carrying out a PID feedback control process which is executed in FIG. 5 for calculating an output duty factor.

FIG. 6 shows a subroutine executed at the step S53 in FIG. 5 for calculating the output duty factor DDOUT by the current F/B control. First, at a step S61, the actual current amount VTCIACT is read in which is an amount of current actually flowing through the coil 100 of the hydraulic pressure control valve 10 and detected by the current-detecting circuit 2a. Then, at a step S62, the provisional duty factor DOUTVT calculated by the cam phase F/B control is converted to a desired current amount VTCIOBJ by using a VTCIOBJ conversion table stored in the ROM.

Figure 7:
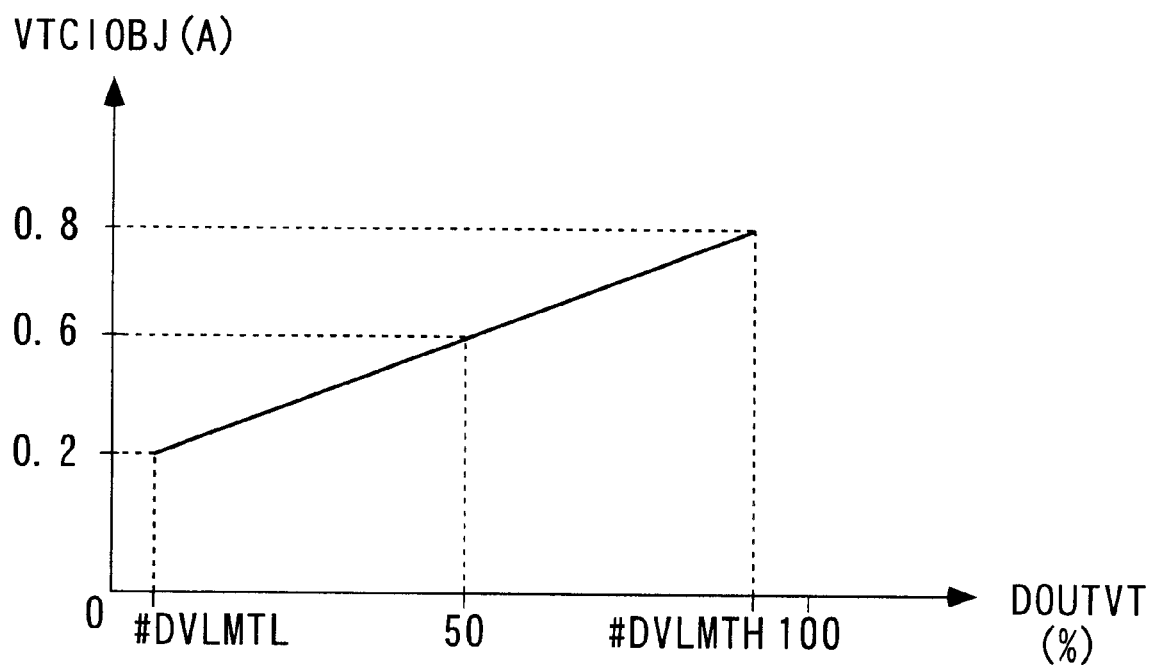
FIG. 7 shows an example of a table for converting a provisional duty factor to a desired current amount.

FIG. 7 shows an example of the VTCIOBJ conversion table. This table shows an optimum (standard) relationship between the provisional duty factor DOUTVT and the amount of current to be supplied to the coil 100 of the hydraulic pressure control valve 10, which is obtained by the provisional duty factor DOUTVT, under a normal temperature condition of the coil 100. This table enables the desired current amount VTCIOBJ to be set according to the provisional duty factor DOUTVT in an unconditional and optimum manner. More specifically, the desired current amount VTCIOBJ is linearly set such that the same is increased as the provisional duty factor DOUTVT becomes larger. For instance, when the value of DOUTVT is 50%, which corresponds to the hold duty factor value, the desired current amount VTCIOBJ is 0.6 A, and when the value of DOUTVT is equal to the above lower limit value #DVLMTL, the desired current amount VTCIOBJ is 0.2 A, while when the value of DOUTVT is equal to the upper limit value #DVLMTH, the desired current amount VTCIOBJ is 0.8 A. Further, a region wherein the value of DOUTVT is equal to or smaller than the lower limit value #DVLMTL, and a region wherein the value of DOUTVT is equal to or larger than the upper limit value #DVLMTH are saturated regions wherein the operating condition of the hydraulic pressure control valve 10 is not changed even if the amount of current flowing through the coil 100 is made smaller than the lower limit value #DVLMTL or larger than the upper limit value #DVLMTH. Therefore, values within the above two regions are subjected to limit checking when the provisional duty factor DOUTVT is calculated, as described hereinbefore, and omitted from the table.

At a step S63, a difference (=VTCIOBJ-VTCIACT) between the desired current amount VTCIOBJ set as above and the actual current amount VTCIACT read in at the step S61 is calculated as a current amount difference ERR. Further, at a step S64, a difference (=VTCIACT (n-)-VTCIACT (n)) between an immediately preceding value of the actual current amount and the present value thereof is calculated as an actual current amount difference DERR.

Next, it is determined at a step S65 whether or not the immediately preceding value flag F_BUVTC associated with the VTC operation enable flag F_VTC stored at the step S57 in FIG. 5 assumes "0". If the answer to the question of the step S65 is affirmative (Yes), i.e. if the present loop is a loop executed immediately after the conditions for carrying out the VTC control have been satisfied, an I term IFBI is set to an initial value #KIFIRST (e.g. 0%) at a step S66, followed by the program proceeding to a next step S67. Further, if the answer to the question of the step S65 is negative (No), i.e. if the present loop is a second or any other subsequent loop after satisfaction of the conditions for carrying out the VTC control, the step S66 is skipped, followed by the program proceeding to the step S67.

At the step S67, a P term IFBP is calculated by multiplying the current amount difference ERR calculated at the step S63 by a P-term gain #NKP (e.g. 0.5). Then, at a step S68, the present value IFBIN of the I term is calculated by multiplying the current amount difference ERR by an I-term gain #NKI (e.g. 0.05), and at a step S69, the present value IFBIN of the I term is added to the immediately preceding value IFBI of the I term to thereby calculate the I term IFBI.

Next, at steps S70 to S73, limit checking of the I term IFBI calculated at the step S69 is carried out. More specifically, it is determined at the step S70 whether or not the I term IFBI is larger than an upper limit value #KILMTH (95%, for instance). If IFBI>#KILMTH holds, the I term IFBI is set to the upper limit value #KILMTH at a step S71. If the answer to the question of the step S70 is negative (No), it is determined at a step S72 whether or not the I term IFBI is smaller than a lower limit value #KILMTL (e.g. 5%). If IFBI<#KILMTL holds, the I term IFBI is set to the lower limit value #KILMTL at the step S73. If the answer to the question of the step S72 is negative (No), i.e. if #KILMTL≦IFBI≦#KILMTH holds, the I term IFBI is maintained.

Next, at a step S74, a D term IFBD is calculated by multiplying the actual current amount difference DERR calculated at the step S64 by a D-term gain #NKD (e.g. 0.01). Finally, at a step S75, the P term IFBP, I term IFBI, and D term IFBD calculated at the preceding steps are added to each other, thereby calculating the output duty factor DDOUT, followed by terminating the program.

As described above, according to the present embodiment, the provisional duty factor DOUTVT is feedback-controlled such that the actual cam phase CAIN becomes equal to the desired cam phase CAINCMD, and at the same time, after converting the provisional duty factor DOUTVT obtained as above to the optimum desired current amount VTCIOBJ by using the VTCIOBJ conversion table, the final output duty factor DDOUT is also feedback-controlled such that the actual current amount VTCIACT flowing through the coil 100 of the hydraulic pressure control valve 10 becomes equal to the desired current amount VTCIOBJ. That is, the actual current amount VTCIACT or the amount of current flowing through the coil 100 is directly detected, and at the same time the output duty factor DDOUT is feedback-controlled such that the detected actual current amount VTCIACT becomes equal to the optimum desired current amount VTCIOBJ. This makes it possible to cope with all the temperature conditions of the coil 100, so as to suitably compensate for variations in the behavior of the hydraulic pressure control valve 10, caused by changes in the temperature of the coil 100. Therefore, it is possible to carry out optimum control of the operations of the hydraulic pressure control valve 10 and the VTC 8 irrespective of the temperature conditions of the coil 100, thereby enhancing accuracy of the cam phase feedback control.

Further, as described hereinbefore, the upper limit value #DVTLMTH of the output duty factor DDOUT is set to a value larger than the upper limit value #DVLMTH of the provisional duty factor DOUTVT, and the lower limit value #DVTLMTL of the output duty factor DDOUT is set to a value smaller than the lower limit value #DVLMTL of the provisional duty factor DOUTVT, so that the range of values which can be assumed by the output duty factor DDOUT is expanded. This makes it possible to suitably control the output duty factor DDOUT in a manner coping with a shift of a controllable range of values of the output duty factor DDOUT, due to the above changes in the temperature of the coil 100.

Figure 8:
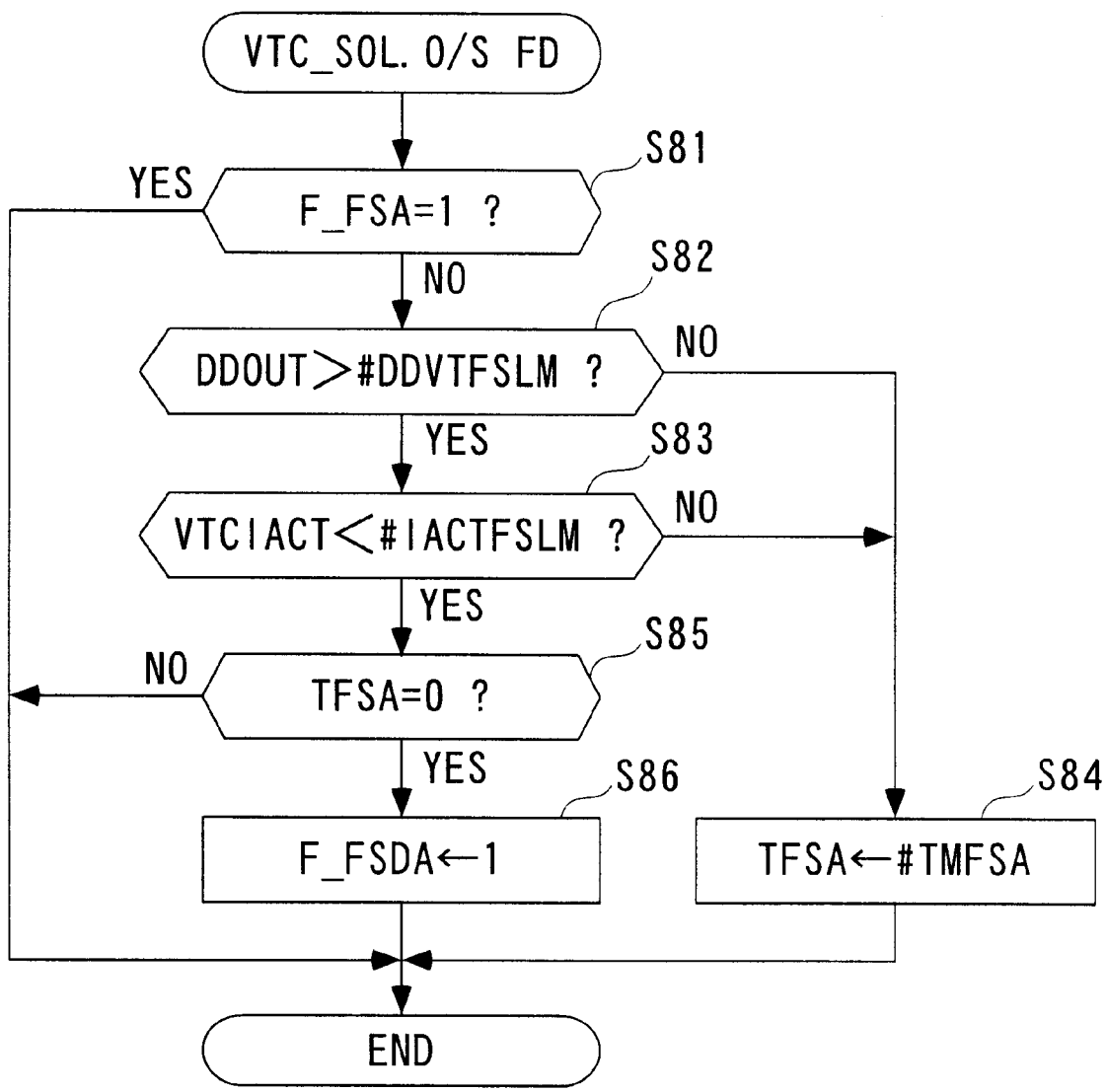
FIG. 8 is a flowchart of a program for detecting a failure of a coil system of a hydraulic pressure control valve.

Next, a method of detecting a failure related to the VTC control will be described with reference to FIGS. 8 to 11. FIG. 8 shows a flowchart of a program for detecting a failure of the coil system of the hydraulic pressure control valve 10, due to a wire breaking, a short-circuit, or the like. The program is executed after the actual current amount VTCIACT is read in, and the output duty factor DDOUT is calculated. First, it is determined at a step S81 whether or not a VTC failure flag F__FSA assumes "1". The VTGC failure flag F__FSA is set to "1" when a failure of the VTC 8 is detected. Therefore, if the answer to the question of the step S81 is affirmative (Yes), determination of a failure of the coil system of the hydraulic pressure control valve 10 is not carried out, and the program is immediately terminated.

On the other hand, if the answer to the question of the step S81 is negative (No), it is determined at a step S82 whether or not the output duty factor DDOUT is larger than a determination threshold #DDVTFSLM (40%, for instance), and at a step S83 whether or not the actual current amount VTCIACT is larger than a determination threshold #IACTFSLM (e.g. 200 mA). If the answer to the question of the step S82 is negative (No) (DDOUT≦#DDVTFSLM), it is determined that the output duty factor DDOUT is not very large and the conditions for carrying out the determination of a failure are not satisfied, followed by the program proceeding to a step S84. At the step S84, an abnormality detection timer TFSA formed by a downcount timer is set to a predetermined time period #TMFSA (e.g. 0.5 seconds), followed by terminating the program. Further, if the answer to the question of the step S83 is negative (No), i.e. if VTCIACT≧#IACTFSLM holds, it is determined that a sufficient current is flowing through the coil 100 of the hydraulic pressure control valve 10 for normal operation thereof, and hence the step S84 is executed.

On the other hand, if the answer to the question of the step S83 is affirmative (Yes), i.e. if DDOUT>#DDVTFSLM holds, and at the same time VTCIACT<#IACTFSLM holds, it is determined at a step S85 whether or not the count of the abnormality detection timer TFSA is equal to "0". If the answer to the question of the step S85 is negative (No), the program is immediately terminated, whereas if TFSA 0 holds, it is determined that a failure has occurred in the coil system of the hydraulic pressure control valve 10, and to indicate this failure, a coil system failure flag F__FSDA is set to "1" at a step S86, followed by terminating the program. As described above, in spite of the fact that the output duty factor DDOUT larger than the determination threshold #DDVTFSLM is output, if only an amount of current smaller than the determination threshold #IACTFSLM is flowing through the coil 100, and at the same time the abnormal state continues for the predetermined time period #TMFSA, it is determined that a failure has occurred. This makes it possible to properly detect a failure of the coil system of the hydraulic pressure control valve 10.

Figure 9:
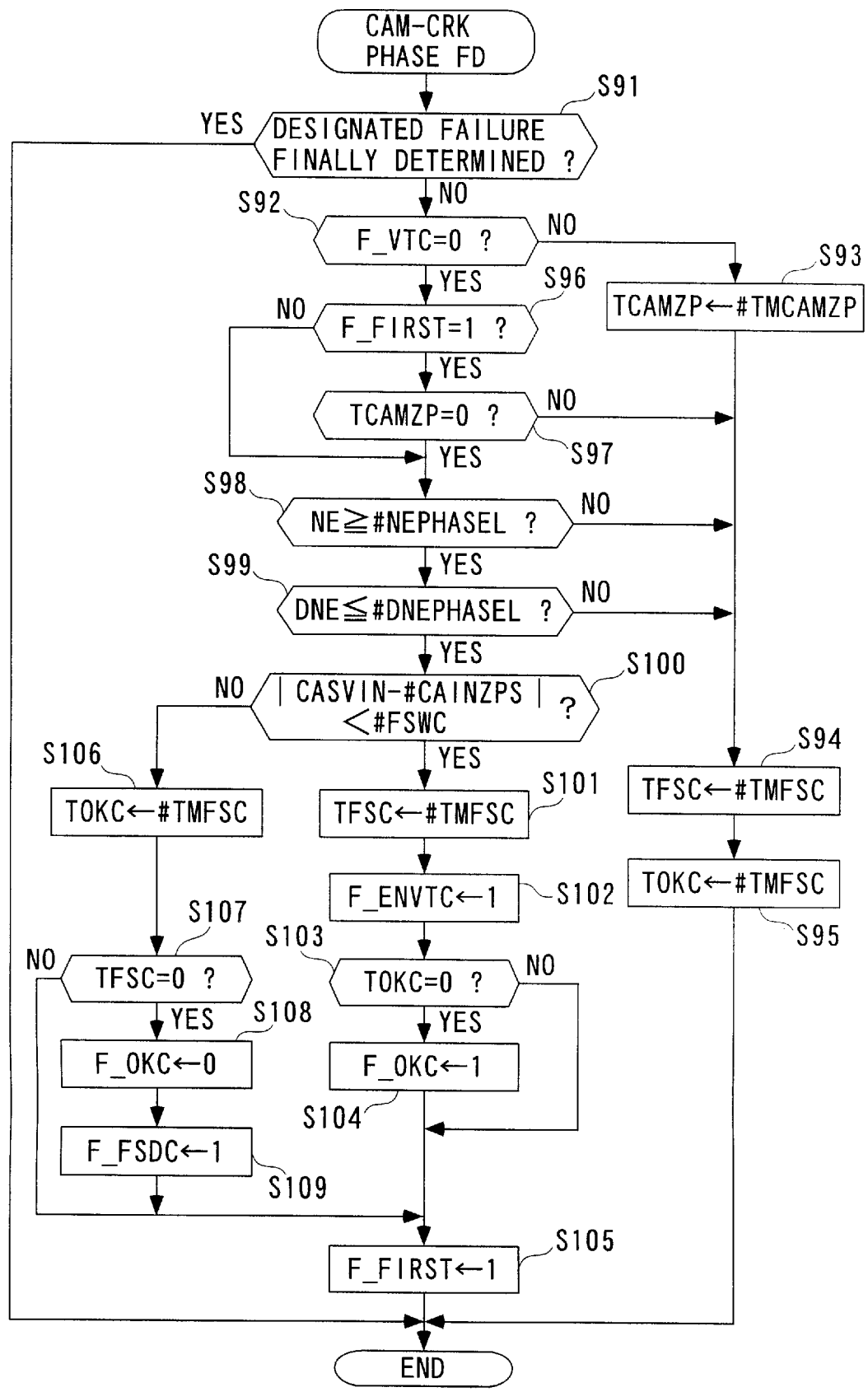
FIG. 9 is a flowchart of a program for executing alignment checking.

FIG. 9 shows a flowchart of a program for executing alignment checking, that is, for detecting an abnormal cam phase shift relative to the crank angle. The abnormal cam phase shift is detected depending on whether or not the cam angle CASVIN from the cam angle sensor 28 is output normally relative to the crank pulse CRK delivered from the crank angle position sensor 29 when the VTC 8 is stopped and placed in the full retard position. In the present program, first, it is determined at a step S91 whether or not the designated failure has already been detected and the detection of the failure is finally determined or finalized. If the answer to the question of the step S91 is affirmative (Yes), the program is immediately terminated, whereas if the answer to the question of the step S91 is negative (No), it is determined at a step S92 whether or not the VTC operation enable flag F__VTC assumes "0". If the answer to the question of the step S92 is negative (No), i.e. if the VTC 8 is in operation, a full retard position shift wait timer TCAMZP is set to a predetermined time period #TMCAMZP (10 ms, for instance) at a step S93. The full retard position shift wait timer TCAMZP is used for waiting for the VTC 8 to reliably shift to the full retard position after being stopped. Then, at steps S94, S95, an abnormality detection timer TFSC, and a normality detection timer TOKC, both referred to hereinafter, are set to a predetermined time period #TMFSC (100 ms, for instance) respectively, followed by terminating the program.

On the other hand, if the answer to the question of the step S92 is affirmative (Yes), i.e. if the VTC 8 is not in operation, it is determined at a step S96 whether or not an alignment determination pass flag F__FIRST assumes "1". The alignment determination pass flag F__FIRST is reset to "0" when the ignition is turned on, and set to "1" at a step S105 once the alignment checking is carried out by using the cam angle CASVIN detected by the cam angle sensor 28, as described hereinbelow. If the answer to the question of the step S96 is affirmative (Yes), i.e. if the alignment checking has already been carried out after the start of the engine 3, it is determined at a step S97 whether or not the count of the full retard position shift wait timer TCAMZP is equal to "0", i.e. whether or not the predetermined time period #TMCAMZP has elapsed after the stop of the VTC 8. If the answer to the question of the step S97 is negative (No), the above steps S94 and S95 are executed, followed by terminating the program.

If the answer to the question of the step S97 is affirmative (Yes), i.e. if the predetermined time period #TMCAMZP has elapsed after the stop of the VTC 8, the program proceeds to a step S98 and steps subsequent thereto, wherein the alignment-checking process is carried out. Further, if the answer to the question of the step S96 is negative (No), i.e. if the alignment determination pass flag F__FIRST=0 holds, it is determined that the ignition has just turned on, and that the VTC 8 is in the full retard position. In this case, the step S97 is skipped, and the program proceeds to the S98 and steps subsequent thereto.

At the step S98, it is determined whether or not the engine rotational speed NE is equal to or higher than a lower limit value #NEPHASEL (e.g. 500 rpm). At a step S99, it is determined whether or not the amount DNE of a change in the engine rotational speed, that is, a difference (=NE(n)−NE(n−1)) between the present value and the immediately preceding value of the engine rotational speed NE is equal to or smaller than an upper limit value #DNEPHASEL (e.g. 10 rpm) thereof. If either of the answers to the questions of the steps S98 and S99 is negative (No), i.e. if NE<#NEPHASEL, or DNE>#DNEPHASEL, it is determined that the engine 3 is not in a stable rotating condition. In this case, the alignment checking is not executed, but the steps S94 and S95 are carried out, followed by terminating the program.

On the other hand, if both of the answers to the questions of the steps S98 and S99 are affirmative (Yes), it is determined at a step S100 whether or not an absolute value |CASVIN−#CAINZPS| of a difference between the cam angle CASVIN detected by the cam angle sensor 28 and a predetermined value #CAINZPS is smaller than a determination threshold #FSWC. The predetermined value #CAINZPS which indicates a reference value in the case of the VTC 8 being in the full retard position is set e.g. to 20 degrees BTDC. Further, the determination threshold #FSWC is set to 10 degrees which corresponds to two teeth of the driven sprocket 6b.

If the answer to the question of the step S100 is affirmative (Yes), i.e. if |CASVIN−#CAINZPS|<#FSWC holds, it means that the cam angle CASVIN is within a predetermined range of angle, and hence it is determined that alignment is normal, and at a step S101, the abnormality detection timer TFSC is set similarly to the step S94. Then at the following step S102, an initial alignment flag F_ENVTC is set to "1". The initial alignment flag F_ENVTC is used in an execution condition determination process, not shown, as one of conditions required to be satisfied for carrying out the VTC control.

Next, it is determined at a step S103 whether or not the count of the normality detection timer TOKC is equal to "0", i.e. whether or not the predetermined time period #TMFSC has elapsed after the alignment was determined to be normal at the step S100. If the answer to the question of the step S103 is negative (No), the program proceeds to the above-mentioned step S105, wherein the alignment determination pass flag F_FIRST is set to "1", whereas if the answer to the question of the step S103 is affirmative (Yes), it is finally determined that the alignment is normal, and to indicate the fact, an alignment normality flag F_OKC is set to "1" at a step S104. Then, the step S105 is carried out, followed by terminating the program.

As described hereinabove, when the VTC 8 is in the full retard position, if the cam angle CASVIN detected by the cam angle sensor 28 is within a predetermined range of angles which is defined by the predetermined value #CAINZPS and the determination threshold #FSWC, the alignment is determined to be normal, and if the state continues for the predetermined time period #TMFSC, it is determined that the detection of normality of the alignment is finalized. This makes it possible to detect the normality of alignment in a suitable and stable manner.

Further, as described hereinbefore, if the alignment determination pass flag F_FIRST=0 holds (No to S96), it is determined that the ignition has just turned on, and that the VTC 8 is in the full retard position, so that the step S97 is skipped, whereby it is possible to execute the alignment checking at the step S100 promptly without waiting for the predetermined time period #TMCAMZP to elapse in order to wait for the VTC 8 to shift to the full retard position. Further, after the alignment is determined to be normal by the alignment checking, the initial alignment flag F_ENVTC is immediately set to "1" at the step S102 without waiting for the predetermined time period #TMFSC to elapse. Therefore, it is possible to promptly start the VTC control in which the setting of the initial alignment flag F_ENVTC is one of the conditions for carrying out the same. Further, when the alignment check control described above is carried out, if the engine 3 is restarted e.g. immediately after the ignition is turned off, the alignment checking at the step S100 can be executed in the course of shift of the VTC 8 to the full retard position. Even in such a case, wrong determination is prevented since the alignment is not finally determined to be normal until the normality detection timer TOKC has timed out.

If the answer to the question of the step S100 is negative (No), i.e. if |CASVIN−#CAINZPS|≧#FSWC holds, the cam angle CASVIN is outside the predetermined range of angles, and if the VTC control is carried out in this state, settings of exhaust emission characteristics and engine output would produce results significantly different from those intended by these settings, so that the alignment is determined to be abnormal. Then, at a step S106, the normality detection timer TOKC is set similarly to the step S95, and it is determined at a step S107 whether or not the count of the abnormality detection timer TFSC is equal to "0", i.e. whether or not the predetermined time period #TMFSC has elapsed after the alignment was determined to be abnormal at the step S100. If the answer to the question of the step S107 is negative (No), the program proceeds to the step S105, wherein the alignment determination pass flag F_FIRST is set to "1", whereas if the answer to the question of the step S107 is affirmative (Yes), it is finally determined that the alignment is abnormal, and to indicate the fact, the alignment normality flag F_OKC is set to "0" at a step S109, and an alignment abnormality flag F_FSDC is set to "1" at a step S109. Then, the step S105 is carried out, followed by terminating the program.

As described above, if the cam angle CASVIN input when the VTC 8 is in the full retard position is outside the predetermined range of angles, it is determined that the alignment is abnormal, and if the state continues for the predetermined time period #TMFSC, it is determined that the detection of the abnormality of the alignment is finalized. This makes it possible to detect the abnormality of alignment in a suitable and stable manner.

Figure 10:
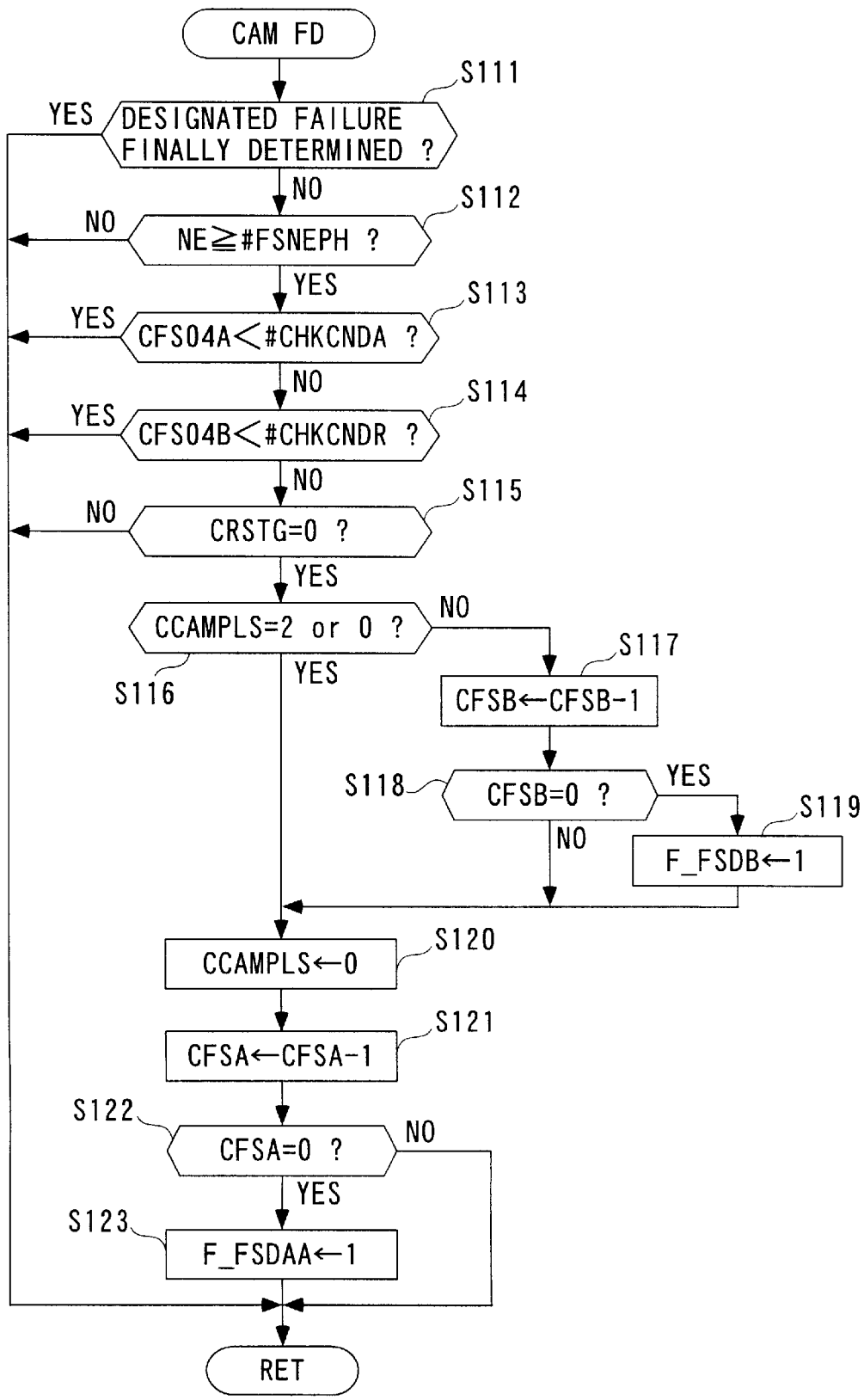
FIG. 10 is a flowchart of a program for detecting a failure of a cam angle sensor.
Figure 11:
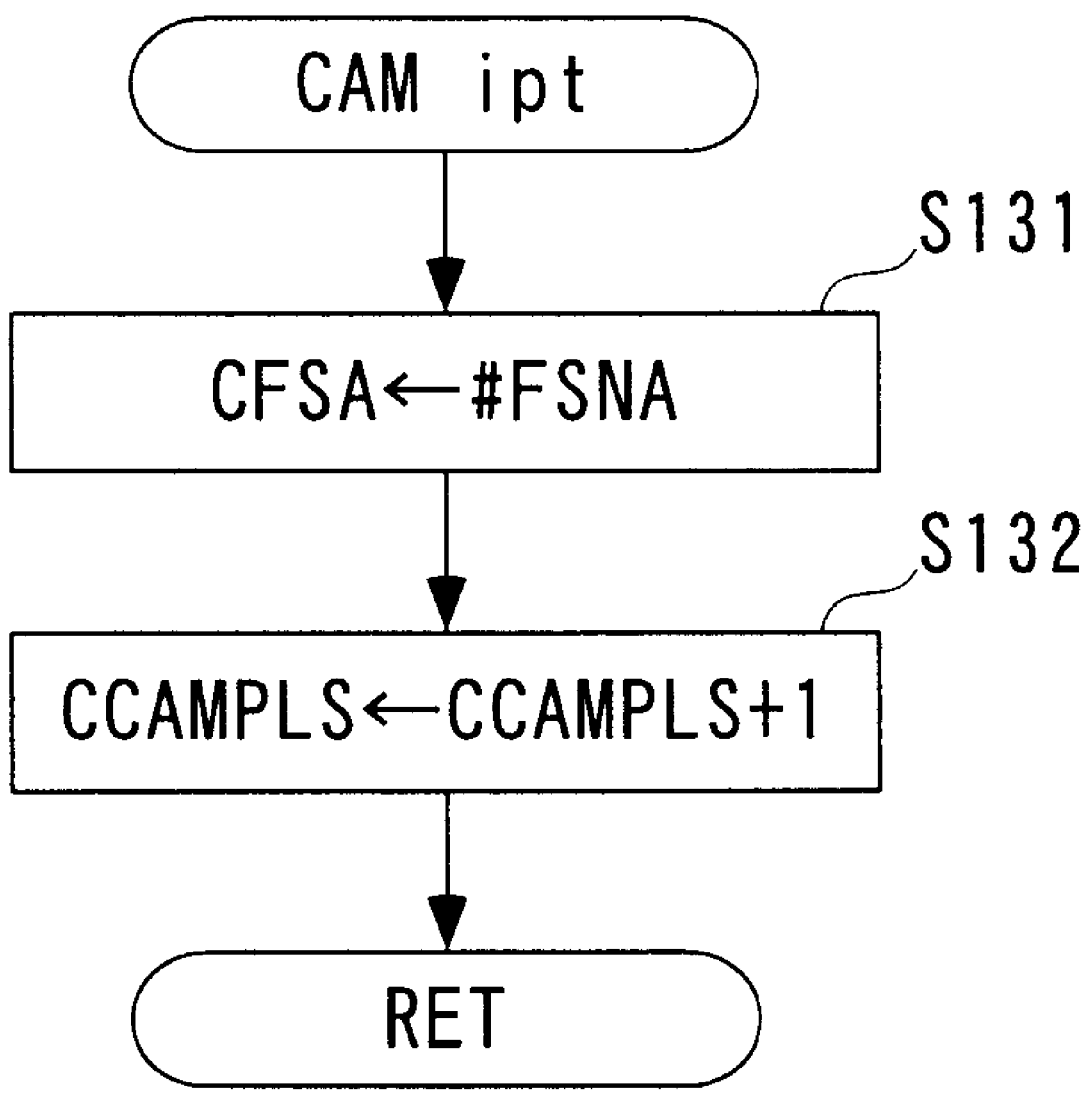
FIG. 11 is a flowchart of a program for causing a cam pulse counter to carry out counting operation.

FIGS. 10 and 11 are flowcharts of a program for detecting a failure of the cam angle sensor 28 due to a wire breaking, a short-circuit, noise, a missing tooth or the like. The failure detection is carried out based on whether or not the cam pulse CAM from the cam angle sensor 28 is output normally with respect to the crank pulse CRK delivered from the crank angle position sensor 29. In the present program, first, it is determined at a step S111 whether or not the designated failure has already been detected and the detection of the failure is finally determined. If the answer to the question of the step S111 is affirmative (Yes), the program is immediately terminated, whereas if the answer to the question of the step S111 is negative (No), it is determined at a step S112 whether or not the engine rotational speed NE is equal to or larger than a lower limit value #FSNEPH (500 rpm, for instance). If NE<#FSNEPH holds, the program is terminated.

If the answer to the question of the step S112 is affirmative (Yes), i.e. if NE≧#FSNEPH holds, it is determined at a step S113 whether or not the count of a wire breaking detection counter CFS04A arranged in the crank angle position sensor 29 is smaller than a predetermined count #CHKCNDA (e.g. 10), and it is determined at a step S114 whether or not the count of a noise detection counter CFS04B arranged in the crank angle position sensor 29 is smaller than a predetermined count #CHKCNDB (e.g. 10). If either of the answers to the questions of the steps S113 and S114 is affirmative (Yes), i.e. if wire breaking detection or noise detection is being executed for the crank angle position sensor 29, the program is immediately terminated. On the other hand, if both of the answers to the questions of the steps S113 and S114 are negative (No), it is determined at a step S115 whether or not a crank stage number CRSTG is equal to "0". The crank stage number CRSTG is set to stage "0" when the above-mentioned tooth of the crank angle position sensor 29 is detected. Thereafter, whenever the crank pulse CRK is detected, i.e. whenever the crankshaft 9 rotates through 30 degrees, "1" is added to the crank stage number CRSTG, whereby numbers 0 to 11 are sequentially set to the stage number GRSTG. Therefore, "CRSTG=0" appears between predetermined crank angle positions whenever the crankshaft 9 rotates through 360 degrees.

If the answer to the question of the step S115 is affirmative (Yes), it is determined at a step S116 whether or not the count of a cam pulse counter CCAMPLS is equal to "0" or "2". The cam pulse counter CCAMPLS is incremented at a step S132 in the FIG. 11 subroutine which is carried out by an interrupt handling routine responsive to each input of the cam pulse. The cam pulse counter CCAMPLS is reset to "0" at a step S120, referred to hereinafter. In other words, the count of the cam pulse counter CCAMPLS at the step S116 indicates the number of times of detecting the cam pulse CAM between the immediately preceding stage "0" and present stage "0" of the crank angle. As described hereinabove, the cam angle sensor 28 is designed such that it outputs a cam pulse CAM whenever the camshaft 6 rotates through 180 degrees, so that if the cam angle sensor 28 operates normally, the count of the cam pulse counter CCAMPLS is equal to "2".

Therefore, if the answer to the question of the step S116 is negative (No), i.e. if the count of the cam pulse counter CCAMPLS is neither "0" nor "2" but an odd number, it is determined that there has occurred an abnormal condition due to noise or a missing tooth, and the noise detection counter CFSB is decremented at a step S117. It should be noted that the noise detection counter CFSB is reset to an initial value #FSNB (e.g. 50) when the ignition is turned on. Then, it is determined at a step S118 whether or not the count of the noise detection counter CFSB is equal to "0". If the answer to the question of the step S118 is negative (No), the program proceeds to the step S120, wherein the cam pulse counter CCAMPLS is reset to "0". On the other hand, if the answer to the question of the step S118 is affirmative (Yes), i.e. if at the step S116, the state in which the count of the cam pulse counter CCAMPLS is neither "0" nor "2" is detected by the number of times equal to the initial value #FSNB, it is determined that a failure due to noise or a missing tooth has occurred in the cam angle sensor 28, and to indicate the fact, a noise/missing tooth failure flag F_FSDB is set to "1" at a step S119, followed by the program proceeding to the step S120.

On the other hand, if the answer to the question of the step S116 is affirmative (Yes), i.e. if the count of the cam pulse counter CCAMPLS is equal to "0" or "2", especially if the count of CCAMPLS is equal to "0", this means that there has occurred an abnormal condition in which a wire breaking or a short-circuit prevents detection of the cam pulse CAM, and hence determination as to the abnormal condition is carried out at a step S121 following the step S120, et seq. That is, the wire breaking detection counter CFSA is decremented at the step S121, and it is determined at a step S122 whether or not the count of CCAMPLS is equal to "0". The wire breaking detection counter CFSA is reset to an initial value #FSNA (50, for instance) at a step S131 in the FIG. 11 subroutine, i.e. whenever the cam pulse CAM is input. Therefore, so long as the cam pulse CAM is normally input, the wire breaking detection counter CFSA is reset to the initial value #FSNA and thereby prevented from assuming "0" even when it is decremented at the step S121. Hence, if the answer to the question of the step S122 is negative (No), it is determined that the cam angle sensor 28 is in normal operation. In this case, the program is immediately terminated.

During a time period over which the cam pulse CAM is not input, the wire breaking detection counter CFSA continues to be decremented at the step S121 without being reset to the initial value #FSNA. When this state continues over a time period corresponding to the number of times of decrements of the counter CFSA, which is equal to the initial value #FSNA, the answer to the question of the step S122 becomes affirmative (Yes), so that it is determined that a failure due to a wire breaking or a short-circuit has occurred in the cam angle sensor 28, and to indicate the fact, a wire breaking/short-circuit failure flag F_FSDAA is set to "1" at a step S123, followed by terminating the program.

The above-mentioned method makes it possible to appropriately detect a failure of the cam angle sensor 28, while discriminating between two groups of failures, i.e. noise and a missing tooth, and a wire breaking and a short-circuit, and further set flags indicative of the respective causes independently of each other.

It should be noted that the invention is not necessarily limited to the above embodiments, but it can be put into practice in various forms. Although in the embodiments, the P-term gain #NKP, I-term gain #NKI, and D-term gain #NKD for use in the current feedback control are set to fixed values, the relationship in size between the desired current amount VTCIOBJ and the actual current amount VTCIACT (or plus and minus signs of the current amount difference ERR) may be determined to thereby set a gain in the case of the desired current amount VTCIOBJ being larger than the actual current amount VTCIACT to a value larger than a gain in the case of VTCIOBJ being smaller than VTCIACT. This makes it possible to control the output duty factor DDOUT more suitably in a manner coping with a change in sensitivity of the hydraulic pressure control valve 10, due to a change in temperature of the coil 100, described hereinbefore.

Further, although in the present embodiment, the invention is applied to the valve timing control system with a variable intake cam phase (variable phase angle of the intake cam relative to the crankshaft), by way of example, this is not limitative, but of course the invention can be applied to a valve timing control system with a variable exhaust cam phase (variable phase angle of the exhaust cam relative to the crankshaft).

It is further understood by those skilled in the art that the foregoing is a preferred embodiment of the invention, and that various changes and modifications may be made without departing from the spirit and scope thereof.

What is claimed is:
1. A valve timing control system for an internal combustion engine, which includes a crankshaft, an intake valve, an exhaust valve, an intake cam, and an exhaust cam, and controls valve timing of at least one of said intake valve and said exhaust valve, by changing a cam phase which is a phase of at least one of said intake cam and said exhaust cam, relative to said crankshaft, the valve timing control system comprising:
    a cam phase change mechanism for changing said cam phase;

a control valve having a coil, for driving said cam phase change mechanism according to an amount of current flowing through said coil;

actual cam phase-detecting means for detecting an actual cam phase;

desired cam phase-setting means for setting a desired cam phase depending on operating conditions of said engine;

cam phase feedback control means for feedback-controlling a control value for control of said amount of current such that said actual cam phase becomes equal to said desired cam phase;

desired current amount-setting means for setting a desired amount of current based on said control value controlled by said cam phase feedback control means;

actual current amount-detecting means for detecting an actual amount of current actually flowing through said coil of said control valve; and current feedback control means for feedback-controlling an output control value for control of said amount of current supplied to said control valve such that said actual amount of current becomes equal to said desired amount of current.

2. A valve timing control system according to claim 1, wherein said control value and said output control value are values of an identical kind of control amount, and wherein a range of values of said identical kind of control amount within which said output control value can be set is wider than a range of values of said identical kind of control amount within which said control value can be set.

3. A valve timing control system according to claim 2, wherein said parameter is a duty factor of output of said current supplied to said coil.

4. A valve timing control system according to claim 1, wherein said desired current amount-setting means includes a conversion table for converting said control amount to said desired amount of current.

5. A valve timing control system according to claim 4, wherein said conversion table represents an optimum relationship between said control value and said desired amount of current obtained by said control value, under a normal temperature condition of said coil.

* * * * *